(12) United States Patent
Takao et al.

(10) Patent No.: US 7,411,487 B2
(45) Date of Patent: Aug. 12, 2008

(54) TIRE-INFORMATION ADMINISTRATION SYSTEM

(75) Inventors: Koji Takao, Kodaira (JP); Tatehiko Yamada, Kodaira (JP); Yoshinori Imamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 47 days.

(21) Appl. No.: 10/542,765

(22) PCT Filed: Jan. 20, 2004

(86) PCT No.: PCT/JP2004/000407

§ 371 (c)(1),
(2), (4) Date: Jul. 20, 2005

(87) PCT Pub. No.: WO2004/067300

PCT Pub. Date: Aug. 12, 2004

(65) Prior Publication Data

US 2006/0139157 A1    Jun. 29, 2006

(30) Foreign Application Priority Data

Jan. 29, 2003  (JP)  ............................. 2003-020566
Jun. 11, 2003  (JP)  ............................. 2003-166510

(51) Int. Cl.
*B60C 23/02* (2006.01)
(52) U.S. Cl. .................. 340/442; 340/444; 340/445; 340/447; 340/449; 340/539.1; 116/34 R; 73/146; 73/146.3; 73/146.5
(58) Field of Classification Search .......... 340/442, 340/444, 445, 447, 449, 443, 539.1; 116/34 R; 73/146, 146.3, 146.5, 146.2, 146.6
See application file for complete search history.

(56) References Cited

U.S. PATENT DOCUMENTS

| 5,540,092 | A | * | 7/1996 | Handfield et al. | .......... 73/146.5 |
| 5,825,286 | A | * | 10/1998 | Coulthard | ................... 340/447 |
| 6,087,930 | A | * | 7/2000 | Kulka et al. | ................. 340/447 |
| 6,271,748 | B1 | * | 8/2001 | Derbyshire et al. | ......... 340/442 |

(Continued)

FOREIGN PATENT DOCUMENTS

JP    A 10-104103    4/1998

(Continued)

*Primary Examiner*—Hung T. Nguyen
(74) *Attorney, Agent, or Firm*—Oliff & Berridge, PLC

(57) ABSTRACT

A tire-information administration system includes a plurality of sensor modules installed in tires; at least one reception module configured to receive data from the sensor modules; and a central control module configured to command the reception module to acquire data from the sensor modules. The central control module includes a predetermined number of connection ports for the reception module, assigned in advance to each sensor modules; and a specifically configured control means. The control means sequentially outputs at predetermined sampling time a command of data acquisition from a sensor module, to the connection port assigned to each sensor module; assigns the connection port to the sensor module for the next sampling, when there is a data input from the sensor module in response to the command; assigns data acquisition from the sensor module to another connection port, and assigns the other connection port to the sensor module for the next sampling, when there is no data input from the sensor module even by the command issuance. Thus, the tire-information administration system maintains communications even in case of troubles of the reception modules or damages of tires.

9 Claims, 7 Drawing Sheets

U.S. PATENT DOCUMENTS

| | | | |
|---|---|---|---|
| 6,362,732 B1 * | 3/2002 | Konchin et al. | 340/446 |
| 2003/0098787 A1 | 5/2003 | Lin | |

FOREIGN PATENT DOCUMENTS

| | | |
|---|---|---|
| JP | A 2002-240521 | 8/2002 |
| JP | A 2003-118333 | 4/2003 |
| JP | A 2003-519586 | 6/2003 |
| JP | A 2003-196777 | 7/2003 |
| JP | A 2003-528378 | 9/2003 |
| JP | A 2003-306017 | 10/2003 |

* cited by examiner

TIRE-INFORMATION ADMINISTRATION SYSTEM

TECHNICAL FIELD

The present invention relates to an improvement in a tire-information administration system comprising: a plurality of sensor modules mounted in tires and configured to detect data related to the tires such as internal pressures of the tires; reception modules configured to receive signals including the data from the sensor modules; and a central control module configured to acquire the data from the reception modules.

BACKGROUND ART

There has been proposed a tire-information administration system for administrating information of tires of a vehicle in operation such as a construction vehicle; in a manner that the system includes sensor modules attached to inner surfaces of the tires, to thereby measure temperatures, pressures and the like of the tires and reception modules configured to receive radio signals including measured data transmitted from the sensor modules; in which the radio signals are transmitted to a vehicle operation administrating center configured to administrate a plurality of vehicles such that the center instructs a driver to take a suitable action if the vehicle is brought into a difficult situation of a possible trouble.

Further, the reception modules of the system are mounted on a vehicle correspondingly to the sensor modules installed in the tires, respectively, and the signals processed in the reception modules are once collected by a central control module of the vehicle, and then transmitted from the central control module via radio waves to the vehicle administration center.

It has been impossible for the above-mentioned conventional tire-information administration system to detect an abnormality in a tire upon occurrence of such an abnormality, if the reception module or the like has become incapable of communicating with the sensor module due to trouble of them. In addition, abnormalities can not be detected even in case of damages of tires such as due to puncture, thereby also causing a problem in safety.

The present invention has been conceived in view of such a problem, and it is therefore an object of the present invention to provide a tire-information administration system capable of: maintaining communications even in case of troubles of reception modules or damages of tires; commonizing a central control module irrespectively of the number of reception modules; and mitigating a service operation for assigning sensor modules to tires, respectively, as required upon exchange or arrangement rotation of tires.

DISCLOSURE OF THE INVENTION

The present invention has been carried out to achieve the above object, and the essential configuration, functions and effects of the present invention will be described hereinafter.

(1) One aspect of the present invention resides in a tire-information administration system comprising: a plurality of sensor modules installed in tire; at least one reception module configured to receive data from the sensor modules; and a central control module configured to command the reception module to acquire data from the sensor modules; wherein said central control module comprises:

a predetermined number of connection ports for the reception modules, assigned in advance to each sensor modules; and control means configured to: sequentially output at predetermined sampling time a command of data acquisition from a sensor module, to the connection port assigned to each sensor module; assign the connection port to the sensor module for the next sampling, when there is a data input from the sensor module in response to the command; and assign data acquisition from the sensor module to another connection port, and assign the other connection port to the sensor module for the next sampling, when there is no data input from the sensor module even by the command issuance.

According to this aspect of the present invention, the central control module comprises a predetermined number of connection ports for the reception module, which ports are assigned in advance to each sensor modules; and control means configured to: sequentially output at predetermined sampling time a command of data acquisition from a sensor module, to the connection port assigned to each sensor module; assign the connection port to the sensor module for the next sampling, when there is a data input from the sensor module in response to the command; and assign data acquisition from the sensor module to another connection port, and assign the other connection port to the sensor module for the next sampling, when there is no data input from the sensor module even by the command issuance; so that the central control module can be commonized, even when not all the connection ports are connected with the reception module, i.e., irrespectively of the number of reception module. Further, even when any reception module is brought into trouble during operation of the system, data acquisition from the sensor module can be assigned to the next reception module, so that trouble in the reception module can be dealt with.

(2) The present invention further provides a tire-information administration system according to item (1), wherein there is outputted a trouble signal of the tire-information administration system, when a response from the sensor module is absent at all the connection ports.

According to this feature of the present invention, it is judged that the sensor module corresponding to the connection port, to which the command is firstly issued, is in trouble, when a response from the sensor module is absent at all the connection ports; so that trouble in the sensor module can also be dealt with. Further, this can be noted by the trouble signal.

(3) The present invention further provides a tire-information administration system according to item (1) or (2), wherein the sensor module includes means for detecting an internal pressure of tire.

According to this feature of the present invention, it is possible to acquire the information concerning internal pressures of each tire.

(4) The present invention further provides a tire-information administration system according to any one of items (1) to (3), wherein the sensor module includes means for detecting a temperature in tire.

According to this feature of the present invention, it is possible to acquire the information concerning temperatures of each tire.

(5) Another aspect of the present invention resides in a tire-information administration system comprising a sensor module mounted in tire, respectively; a reception module configured to receive data from the sensor module; and a central control module configured to command the reception module to acquire data from the sensor module;

wherein the reception module comprises: a plurality of antennas each arranged near any one of tires and configured to transmit and receive signals to and from the sensor module; a single reception body portion connected to the antennas via wirings; and antenna switching means for electrically connecting and disconnecting between the reception body portion and each antennas; and wherein the reception body portion is provided with control means for modulating a command signal from the central control module to thereby generate an output signal to antenna, and for demodulating a signal from antenna to thereby output data to the central control module.

According to this feature of the present invention, only the antennas assuming the functions for transmission to and receipt from the sensor module, are arranged near the sensor module, so that the reception-body portion can be arranged at a location where the reception body portion is never damaged by flying and attacking stones or the like, or the reception body portion can be covered by a metal casing or the like, in a manner that the parts to be possibly damaged by flying and attacking stones or the like are limited to the antennas, thereby enabling minimization of such damage.

Further, with the above-mentioned tire-information administration system, the single reception body portion is configured to possess those functions for generating output signals to antennas and for decoding signals from the antennas, which have been conventionally assumed by a plurality of reception modules, thereby enabling a cost for reception module to be cut. Note that the antenna switching means for connecting and disconnecting between the reception body portion and the antennas, assumes switching functions which have been assumed by a central control module for each reception modules in a conventional system.

(6) The present invention further provides a tire-information administration system according to item (5), further comprising an amplifier configured to amplify said transmission signal and said receipt signal, near each antenna.

According to this feature of the present invention, the system further comprises an amplifier configured to amplify the transmission signals and receipt signals, near each antenna, thereby enabling compensation for loss between the reception body portion and each antenna.

(7) The present invention further provides a tire-information administration system according to item (5) or (6), wherein the sensor module is previously assigned to the antenna, respectively; and wherein said central control module is configured to conduct procedures for: sequentially outputting at predetermined sampling time a command of data acquisition from a sensor module, to the antenna assigned to each sensor module; assigning the antenna to the sensor module for the next sampling, when there is a data input from the sensor module in response to the command; and assigning data acquisition from the sensor module to another antenna, and assigning the other antenna to the sensor module for the next sampling, when there is no data input from the sensor module even by the command issuance.

According to this feature of the present invention, the central control module can be commonized, even when any one of the antennas is not assigned to the sensor modules, i.e., irrespectively of the number of antennas. Further, even when any antenna is brought into trouble during operation of the system, data acquisition from sensor module can be assigned to the next antenna, so that such troubles can be dealt with.

(8) The present invention further provides a tire-information administration system according to item (7), wherein there is outputted a trouble signal of the tire-information administration system, when a response from the sensor module is absent at all the antennas.

According to this feature of the present invention, it is judged that the sensor module corresponding to the connection port, to which the command is firstly issued, is in trouble, when a response from the sensor module is absent at all the antennas; so that trouble in the sensor module can also be dealt with. Further, this can be noted by the trouble signal.

(9) Still another aspect of the present invention resides in a tire-information administration system comprising: a plurality of sensor modules, mounted in tires, respectively, which detect internal pressures of tires; an antenna each arranged near any one of the tires and configured to transmit and receive signal to and from the sensor modules; and a central control module configured to control transmission signal from each antenna and transmission timing thereof;

wherein the sensor modules are provided with receipt signal strength measuring means for measuring a strength of a receipt signal; and wherein the central control module is provided with: receipt signal strength acquisition control means for commanding all the sensor modules mounted on a vehicle, to measure receipt signal strength for signal transmitted from each antenna and to transmit measurement result; and sensor module position specifying means for specifying installed position of the tire having each sensor module mounted thereto, based on receipt signal strength measurement data from each sensor module.

Generally, for a signal transmitted from an antenna, the highest receipt signal strength is exhibited by a sensor module located closest to that antenna. According to the above-mentioned aspect of the present invention, the central control module is provided with the above-mentioned receipt signal strength acquisition control means and the sensor module position specifying means, and it has been established that the antennas are arranged near which of the tires, respectively, so that the central control module is capable of judging that the sensor module exhibiting the highest receipt signal strength for each antenna is mounted in tire located closest to the antenna, thereby enabling automatization of assignment operation of the sensor modules to the tires, to thereby remarkably decrease laborious efforts required for exchange or arrangement rotation of tires.

(10) The present invention further provides a tire-information administration system according to item (9), wherein said antenna is configured to have directivity, and each antenna is mounted in a posture to exhibit a higher directivity in the direction of the associated tire.

According to this feature of the present invention, each antennas is mounted in a posture to exhibit a higher directivity in the direction of the associated tire, so that the receipt strength of the sensor module arranged correspondingly to each antenna can be made remarkably higher than receipt strengths of the remaining sensor modules, to thereby more assuredly specify positions of the sensor modules.

(11) The present invention further provides a tire-information administration system according to item (9) or (10), wherein said receipt signal strength acquisition control means and said sensor module position specifying means are configured to conduct respective execution procedures, correspondingly to timing of engine starting of a vehicle.

According to this feature of the present invention, the timing of the execution procedures of the receipt signal strength acquisition control means and the sensor module position specifying means are correspond to engine starting, so that a new assignment relationship between sensor modules and tires after exchange or arrangement rotation of the tires, with the engine stopped, can be reflected to vehicle running just after the service of exchange or the like of the tires.

BEST MODE FOR CARRYING OUT THE INVENTION

Figure 1:
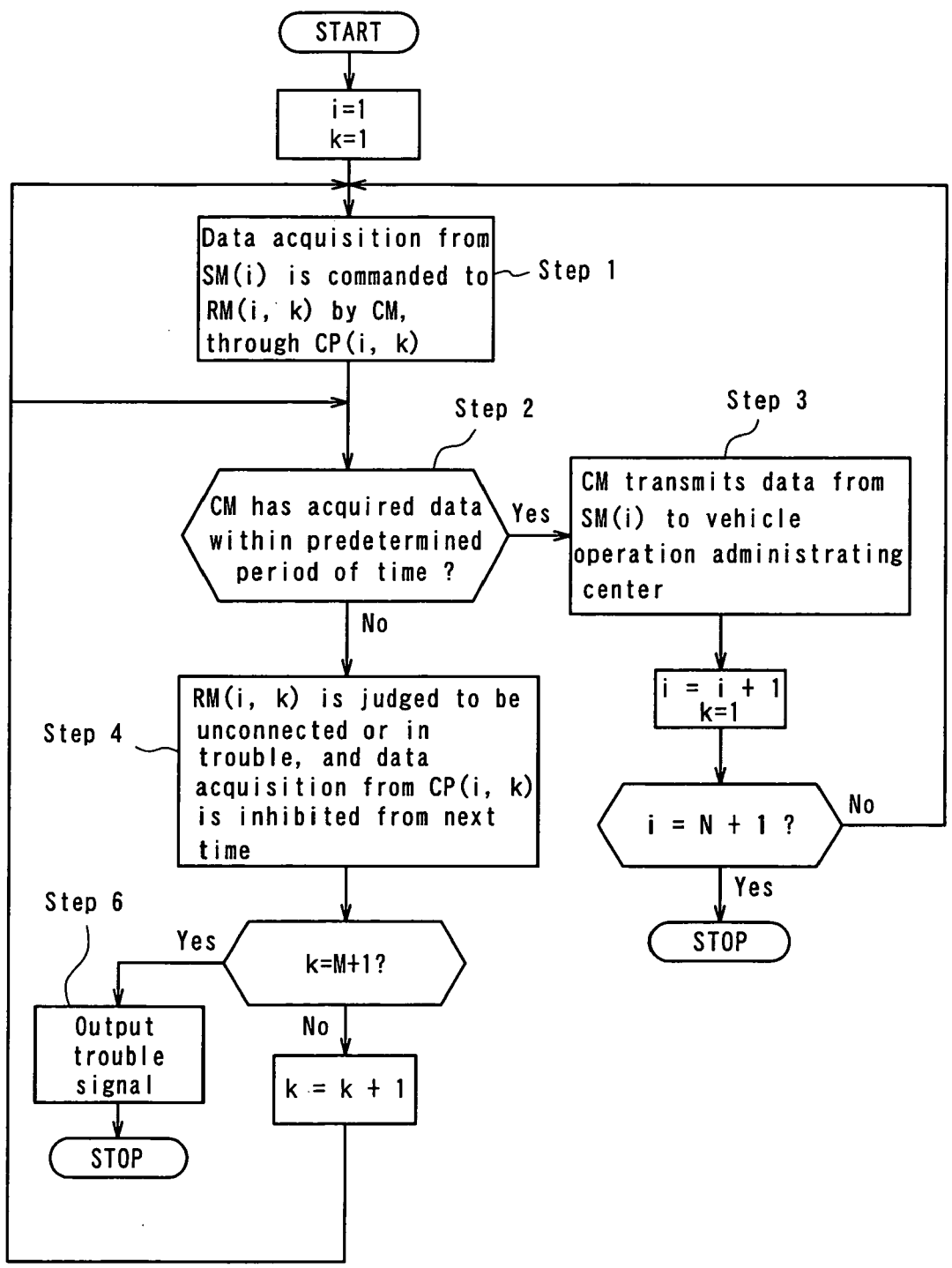
FIG. 1 is a flowchart for explaining an example of an algorithm in a tire-information administration system according to a first embodiment of the present invention.

There will be explained embodiments of the present invention with reference to the drawings. FIG. 1 is a flowchart for explaining an example of an algorithm in a tire-information administration system according to a first embodiment. In FIG. 1, CM represents a central control module, SM(i) represents a sensor module, RM(i, k) represents a reception module assigned to the sensor module SM(i) at a k-th priority rank, and CP(i, k) represents a connection port for the reception module RM(i, k), wherein i=1, . . . , N (N is the number of sensor modules installed in tires, respectively), and k=1, . . . , M (M is the number of reception modules).

Herein, "a reception module assigned at a k-th priority rank" refers to that reception module which is to be assigned to a sensor module SM(i), in a situation where the sensor module SM(i) has been assigned to a reception module RM(i, 1) (k=1) and communication has been tried to start between them, and where communication has not been established between the sensor module SM(i) and any of the 1st through (k−1)-th reception modules.

There will be explained an example of the tire-information administration system of this embodiment, with reference to FIG. 1. Firstly, data acquisition from an SM(1, 1) is commanded to an RM(1, 1) through a CP(1, 1) under control of the CM (step 1). The data may be configured to include, in a predetermined order, an ID of the applicable sensor module, and data of pressure, temperature, and the like, for example. Next, it is judged whether the CM has acquired the data within a predetermined period of time such as 3 ms (step 2).

In case of success of data acquisition for the CM within the predetermined period of time, the data from the SM(1) is transmitted to a vehicle operation administrating center by the CM (step 3). Thereafter, the same procedures are repeated. Contrary, in case of failure of data acquisition for the CM within the predetermined period of time, it is judged that the RM(1, 1) is unconnected or in trouble, and data acquisition through the associated CP(1, 1) is brought to be inhibited from the next time (step 4). Further, when it is judged that the RM(1, 1) is unconnected or in trouble, the CM commands data acquisition from the SM(1), from which data acquisition has been failed, to an RM(1, 2) through a CP(1, 2) at the next priority rank (step 5). In this way, when data acquisition from the SM(1) is not eventually achieved even by the last RM(1, M), there is outputted a trouble signal of the tire-information administration system (step 6).

By repeating the above procedure from the SM(1) to an SM(N), it becomes possible, under control of the central control module CM, to: issue a command of data acquisition from each sensor module SM(i), to a connection port CP(i, k1) corresponding to the sensor module SM(i) in an order from i=1 (k1 is a priority rank corresponding to a reception module which has firstly succeeded in communication establishment); sequentially receive data transmitted from the sensor modules to the reception modules correspondingly to the commands; absent a response from a certain reception module, issue a command of data acquisition from the sensor module of a tire assigned to that connection port through which a response from the associated reception module was absent, to a connection port at the next priority rank; and thus acquire data from the sensor module of the tire corresponding to the non-responding reception module.

Conducting the data acquisition procedures from the SM(1) to the SM(N) for the first time enables automatic ascertainment of the connection ports connected with the reception modules in this system irrespectively of connecting conditions between the reception modules and connection ports, thereby allowing automatic assignment of the reception modules such that signals from all the sensor modules can be received. Further, when a certain applicable reception module, which has been recognizable through an associated connection port during the procedure for the first time, has become unrecognizable even through the associated connection port during procedures from the SM(1) to SM(N) at the second time onward in a normal operation, the applicable reception module is regarded as being in trouble, and it is possible to automatically assign another reception module to an applicable sensor module to thereby receive a signal from the sensor module.

Figure 2:
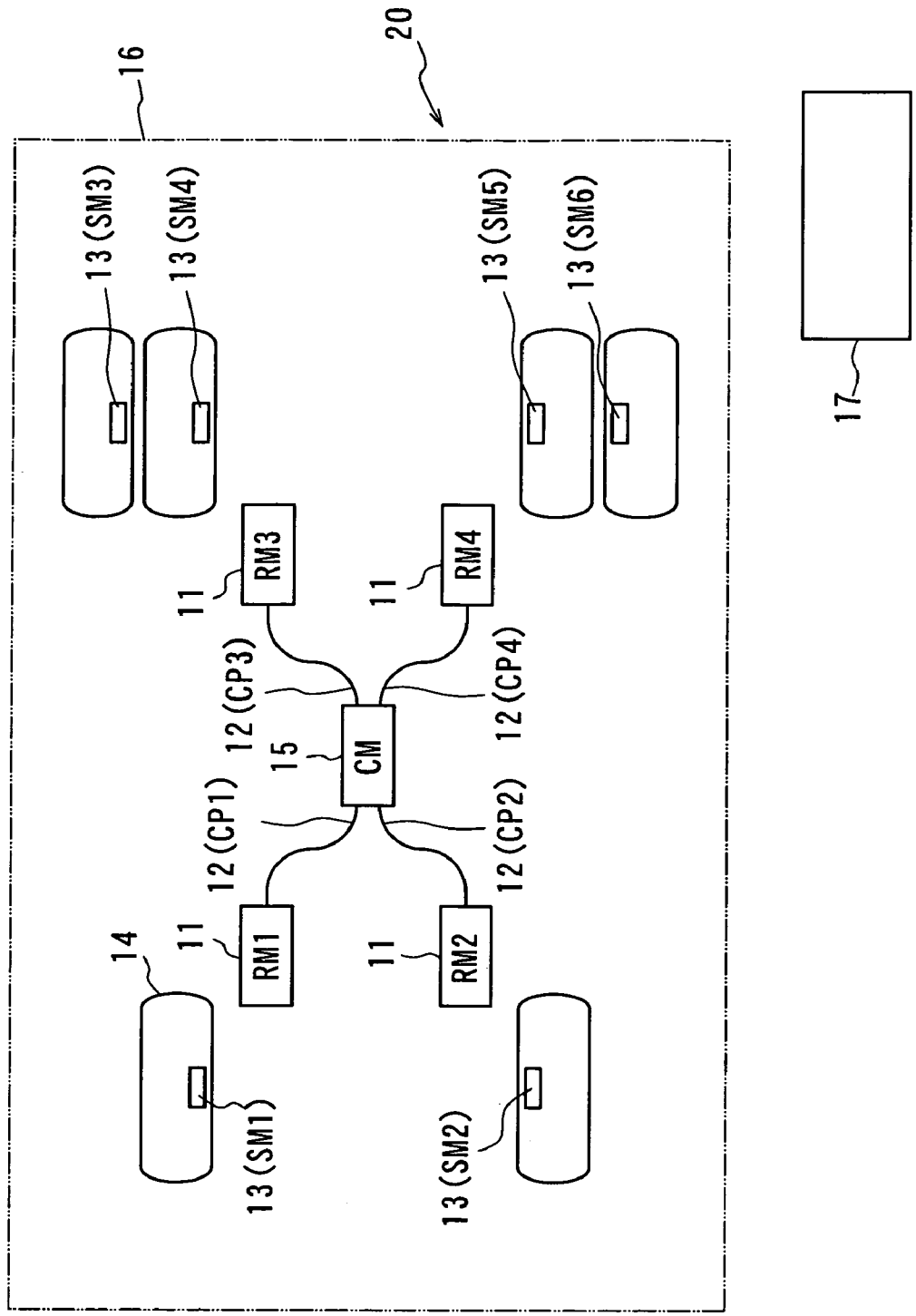
FIG. 2 is a block diagram showing an example of the tire-information administration system according to the first embodiment.

The tire-information administration system of the present invention will be detailedly explained, along with a concrete example. FIG. 2 is a block diagram showing an example of the tire-information administration system of this embodiment. In the example shown in FIG. 2, the tire-information administration system 20 is configured with: sensor modules 13 (SM1 through SM6) mounted in tires 14 of a vehicle 16, respectively; reception modules 11 (RM1 through RM4) configured to receive radio signals including data of temperatures, pressures, and the like from the sensor modules 13, respectively; a central control module 15 (CM) configured to collect signals from the reception modules 11; and a vehicle administration center 17 configured to monitor operating conditions of tires by receiving the signals transmitted via radio waves from the central control module 15.

In this example, the central control module 15 has four connection ports 12 (CP1 through CP4) individually connected with the reception modules 11 (RM1 through RM4), respectively. Further, the RM1 of the reception module 11 is assigned to the SM1 of the sensor module 13, the RM2 of the reception module 11 is assigned to the SM2 of the sensor module 13, the RM3 of the reception module 11 is assigned to the SM3 and SM4 of the sensor modules 13, and the RM4 of the reception module 11 is assigned to the SM5 and SM6 of the sensor modules 13.

Figure 3:
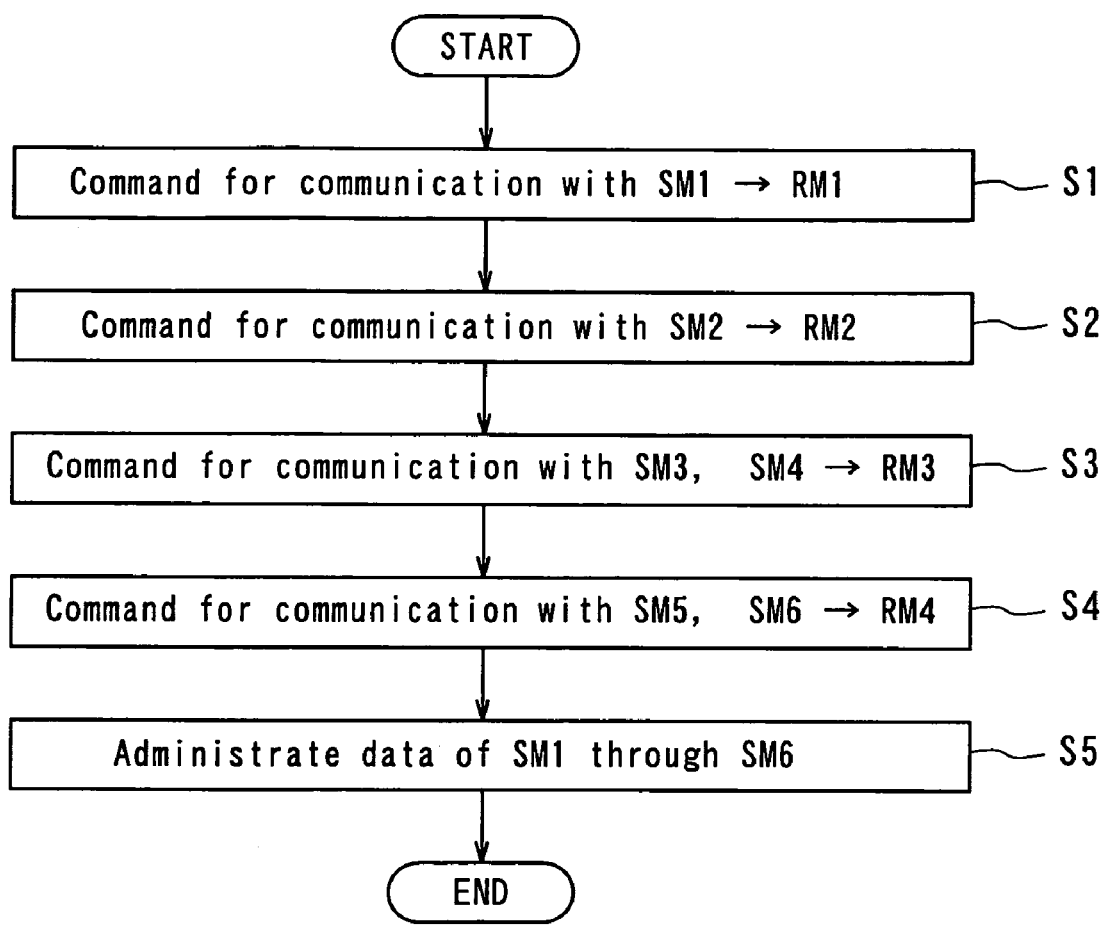
FIG. 3 is a flowchart showing an example of control in the tire-information administration system shown in FIG. 2.

Next, there will be explained an actual operation in the tire-information administration system 20 shown in FIG. 2. FIG. 3 is a flowchart showing an example of control in the tire-information administration system 20 shown in FIG. 2.

Explaining the control flow according to the illustration of FIG. 3, there is firstly issued a command through the CP1 to the RM1 under control of the CM, for communicating with the SM1 (S1). Then, the RM1 executes communication with the SM1, to transmit data of the SM1 to the CM through the CP1. Next, there is issued a command through the CP2 to the RM2 under control of the CM, for communicating with the SM2 (S2). Then, the RM2 executes communication with the SM2, to transmit data of the SM2 to the CM through the CP2. Next, there is issued a command through the CP3 to the RM3 under control of the CM, for communicating with the SM3 and SM4 (S3). Then, the RM3 executes communication with the SM3 and SM4, to transmit data of the SM3 and SM4 to the CM through the CP3. Next, there is issued a command through the CP4 to the RM4 under control of the CM, for communicating with the SM5 and SM6 (S4). Then, the RM4 executes communication with the SM5 and SM6, to transmit data of the SM5 and SM6 to the CM through the CP4. Finally, the CM administrates the data of the SM1 through SM6 (S5).

Figure 4:
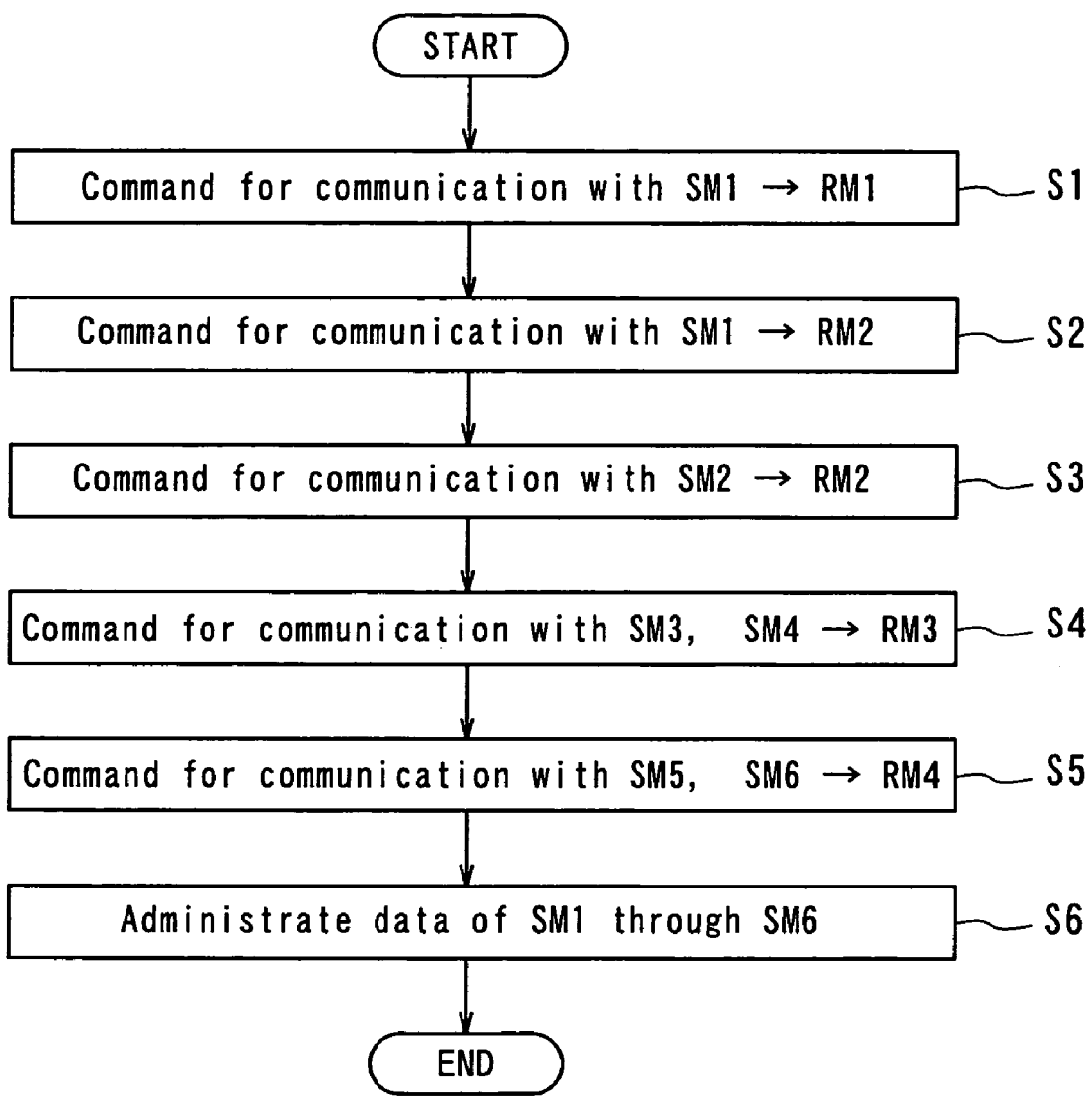
FIG. 4 is a flowchart showing another example of control in the tire-information administration system shown in FIG. 2.

FIG. 4 is a flowchart showing another example of control in the tire-information administration system 20 shown in FIG. 2. The example shown in FIG. 4 is the flowchart where the RM1 is in trouble or is troubled in course of operation. Explaining the control flow according to the illustration of FIG. 4, there is firstly issued a command through the CP1 to the RM1 under control of the CM, for communicating with the SM1 (S1). Here, data from the SM1 is not transmitted to the CM even after a lapse of a limited period of time, thereby showing that the RM1 is in trouble. In this case, there is issued a command through the CP2 to the RM2 under control of the CM, for communicating with the SM1 so as to acquire data of the SM1 (S2). Then, the RM2 executes communication with the SM1 (while assuming that data acquisition has been allowed within a limited period of time), to transmit the data of the SM1 to the CM through the CP2. Thereafter, data acquisition from the SM1 is assigned to the RM2 in a manner to issue a command of data acquisition to the RM2 through the CP2 without issuing a command for data acquisition to the CP1. Moreover, in case of failure of data acquisition even by the CP2, there is sequentially issued a command to the CP3 and possibly to CP4 for data acquisition from the SM1, and if all the data acquisition commands have failed, it is judged that the SM1 is in trouble and thus countermeasures thereof are taken.

Thereafter, identically to the normal control shown in FIG. 3, there is issued a command through the CP2 to the RM2 under control of the CM, for communicating with the SM2 (S3). Then, the RM2 executes communication with the SM2, to transmit data of the SM2 to the CM through the CP2. Next, there is issued a command through the CP3 to the RM3 under control of the CM, for communicating with the SM3 and SM4 (S4). Then, the RM3 executes communication with the SM3 and SM4, to transmit data of the SM3 and SM4 to the CM through the CP3. Next, there is issued a command through the CP4 to the RM4 under control of the CM, for communicating with the SM5 and SM6 (S5). Then, the RM4 executes communication with the SM5 and SM6, to transmit data of the SM5 and SM6 to the CM through the CP4. Finally, the CM administrates the data of the SM1 through SM6 (S6).

Both the above-mentioned control in a normal condition (the flowchart of FIG. 3) and the control in case of trouble occurrence (the flowchart of FIG. 4), can be automatically achieved by the control algorithm for the tire-information administration system of the present invention shown in FIG. 1. Further, although the above-mentioned embodiment exemplifies the situation where the RM's individually correspond to all the four CP's of the CM, the algorithm shown in FIG. 1 is similarly utilizable even when not all the CP's are connected with the RM's, so that the CM can be commonly used irrespectively of a size and the like of a vehicle.

Note that utilization of the above-mentioned present invention also enables data transmission for a plurality of sensor modules by one reception module, thereby allowing a simpler design of a tire-information administration system.

Figure 5:
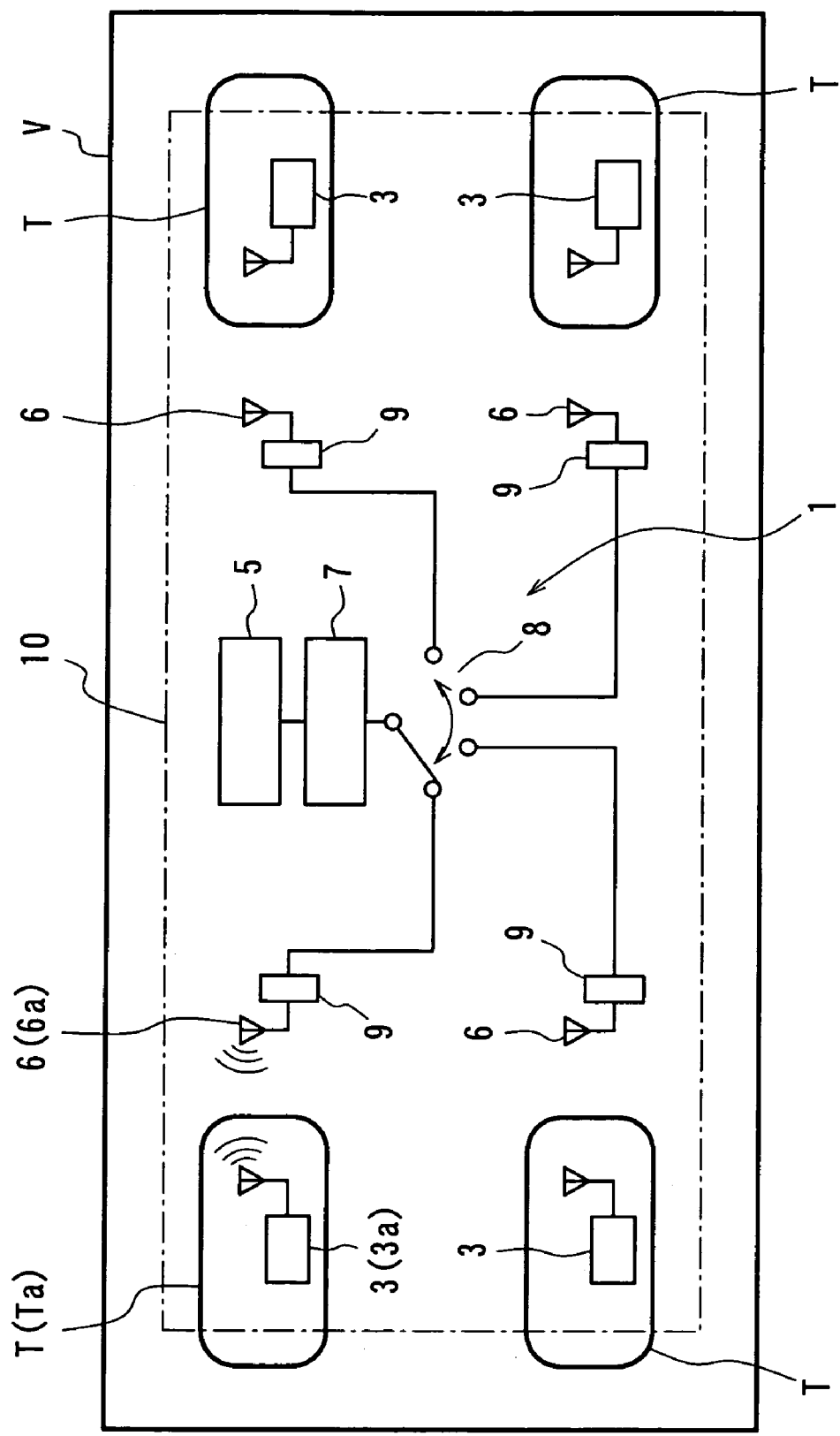
FIG. 5 is a system constitutional view of a tire-information administration system according to a second embodiment of the present invention.

Next, there will be explained a second embodiment according to the present invention. FIG. 5 is a system constitutional view of a tire-information administration system according to this embodiment. The tire-information administration system 10 is provided in a vehicle V and comprises: sensor modules 3 mounted in tires T, respectively; a reception module 1 configured to receive data from the sensor modules 3; and a central control module 5 configured to command data acquisition from the sensor modules 3 to the reception module 1. The reception module 1 comprises: a plurality of antennas 6 arranged near the tires T and configured to transmit and receive signals to and from the sensor modules 3, respectively; a reception body portion 7 connected to the antennas 6 via wirings; and antenna switching means 8 for connecting and disconnecting between the reception body portion 7 and the antennas 6. The reception body portion 7 is provided with control means for modulating a command signal from the central control module 5 to thereby generate an output signal to each antenna 6, and for decoding a signal from each antenna 6 to thereby output data therefrom to the central control module 5.

Further, amplifiers 9 are provided between the reception body portion 7 and the antennas 6, respectively, near the antennas 6, each amplifier 9 being configured to amplify a transmission signal to the sensor module 3 and a receipt signal from the sensor module 3. Although the antenna switching means 8 can be configured with a wiring relay, a semiconductor switch or the like, it is possible to provide hardware ports constantly connected to the antennas 6, respectively, within the reception body portion 7, and to conduct opening and closing of the ports by a software.

In this tire-information administration system 10, the central control module 5 periodically conducts, at constant intervals, a procedure for acquiring data of internal pressures and the like of the tires T from the sensor modules 3 mounted thereto, respectively, and the operation for one round of processing routine thereof is as follows. Firstly, the central control module 5 outputs a signal for commanding the reception body portion 7 to acquire an ID of a first sensor module 3a and data from this sensor module 3a. The reception body portion 7 outputs a modulation signal obtained by modulating the outputted signal to a first antenna 6a, and in advance thereof, the reception body portion 7 or central control module 5 has controlled the antenna switching means 8 to bring it into a state selecting the first antenna 6a.

In this way, the modulation signal from the reception body portion 7 is transmitted from the first antenna 6a, and at least the first sensor module 3a is capable of receiving this signal because the first sensor module 3a is located near the first antenna 6a, such that the first sensor module 3a checks the data transmission command and the transmitted ID and then transmits data concerning an tire Ta. This signal can be received by at least the first antenna 6a, and at this time, the antenna switching means 8 is in the state selecting the first antenna 6a so that the reception body portion 7 is allowed to receive the signal. The reception body portion 7 having received the signal extracts therefrom data concerning the tire by a demodulation processing, and outputs the data to the central control module 5.

The operation for one round of processing routine is completed by conducting the above-mentioned procedure conducted for the first sensor module 3*a*, sequentially for the second through fourth sensor modules 3. In this way, the data collected by the central control module 5 are transmitted, as required, to a vehicle-mounted supervising apparatus (not shown) which also monitors conditions of components other than the tires, and the data transmitted to the supervising apparatus are in turn transmitted to a vehicle operation administrating center for administrating a plurality of vehicles.

Figure 6:
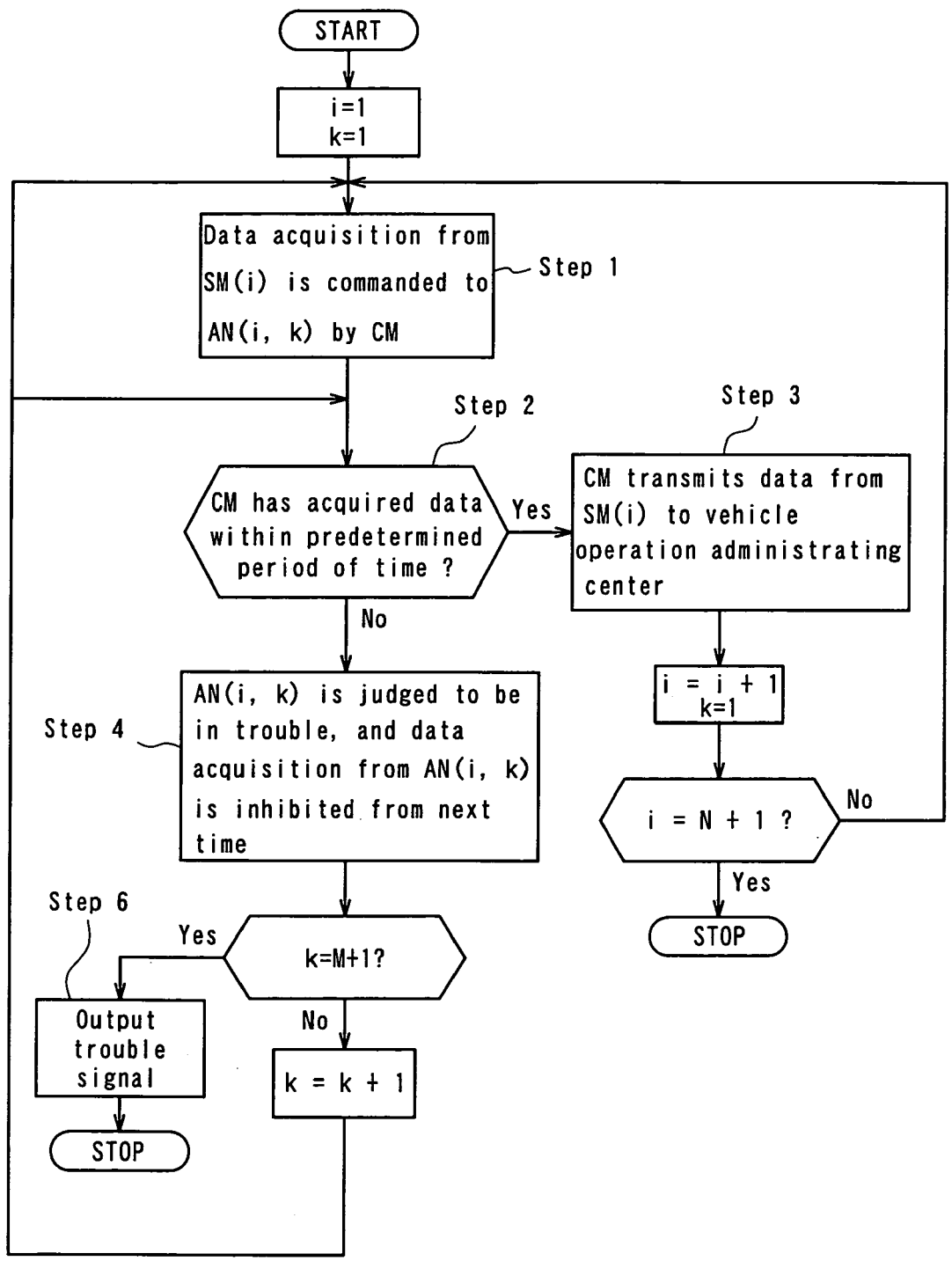
FIG. 6 is a flowchart for explaining an example of an algorithm in the tire-information administration system according to the second embodiment.

Also in the tire-information administration system according to the second embodiment, the sensor modules 3 are previously assigned to the associated antennas 6, respectively, and the central control module 5 conducts procedures for: sequentially outputting at predetermined sampling intervals a command of data acquisition from each sensor module 3, to the antenna 6 assigned to the sensor module 3; assigning the antenna 6 to the sensor module 3 for the next sampling, when there is a data input from the sensor module 3 in response to the command; and assigning data acquisition from the sensor module 3 to another antenna 6, and assigning the other antenna 6 to the sensor module 3 for the next sampling, when there is no data input from the sensor module 3 even by the command issuance; and the procedures will be explained with reference to FIG. 6 which is a flowchart for explaining an example of an algorithm for the procedures. In FIG. 6, CM represents the central control module, SM(i) represents a sensor module, and AN(i, k) represents an antenna assigned to the sensor module SM(i) at a k-th priority rank, wherein i=1, . . . , N (N is the number of sensor modules installed in tires, respectively), and k=1, . . . , M (M is the number of antennas).

Herein, "an antenna assigned at a k-th priority rank" refers to that antenna which is to be assigned to a sensor module SM(i), in a situation where the sensor module SM(i) has been assigned to an antenna AN(i, 1) (k=1) and communication has been tried to start between them, and where communication has not been established between the sensor module SM(i) and any of the 1st through (k1)-th antennas.

There will be explained an example of the tire-information administration system of this embodiment, with reference to FIG. 6. Firstly, data acquisition from an SM(1, 1) is commanded to an AN(1, 1) under control of the CM (step 1). Next, it is judged whether the CM has acquired the data within a predetermined period of time such as 3 ms (step 2).

In case of success of data acquisition by the CM within the predetermined period of time, the data from the SM(1) is transmitted to a vehicle operation administrating center by the CM (step 3). Thereafter, the same procedures are repeated. Contrary, in case of failure of data acquisition for the CM within the predetermined period of time, it is judged that the AN(1, 1) is in trouble, and data acquisition through the AN(1, 1) is brought to be inhibited from the next time (step 4). Further, when it is judged that the AN(1, 1) is in trouble, the CM commands data acquisition from the SM(1), from which data acquisition has been failed, to an AN(1, 2) at the next priority rank (step 5). In this way, when data acquisition from the SM(1) is not eventually achieved even by the last AN(1, M), there is outputted a trouble signal of the tire-information administration system (step 6).

By repeating the above procedure from the SM(1) to an SM(N), it becomes possible under control of the central control module CM, to: issue a command of data acquisition from each sensor module SM(i), to an antenna AN(i, k1) corresponding to the sensor module SM(i) in an order from i=1 (k1 is a priority rank corresponding to a antenna which has firstly succeeded in communication establishment); sequentially receive data transmitted from the sensor modules to the antennas correspondingly to the commands; absent a response from a certain antenna, issue a command of data acquisition from the sensor module, to an antenna at the next priority rank; and thus acquire data from the sensor module.

Conducting the data acquisition procedures from the SM(1) to the SM(N) for the first time enables automatic ascertainment of the functionable antennas in this system irrespectively of conditions of the antennas, thereby allowing automatic assignment of the antennas such that signals from all the sensor modules can be received. Further, when a certain antenna, which has been recognizable at the first time, has become unrecognizable during procedures from the SM(1) to SM(N) at the second time onward in a normal operation, the antenna is regarded as being in trouble, and it is possible to automatically assign another antenna to an sensor module to thereby receive a signal from the sensor module.

The central control module 5 further comprises: receipt signal strength acquisition control means for commanding all the sensor modules 3 mounted on the vehicle V, to measure receipt signal strengths for signals transmitted from the antennas 6 and to transmit measurement results; and sensor module position specifying means for specifying installed positions of the tires T having the sensor modules 3 mounted thereto, respectively, based on the receipt signal strength measurement data acquired by the receipt signal strength acquisition control means; and these means are cooperatively constituted of a CPU, a memory, a program stored in the memory, and the like.

Figure 7:
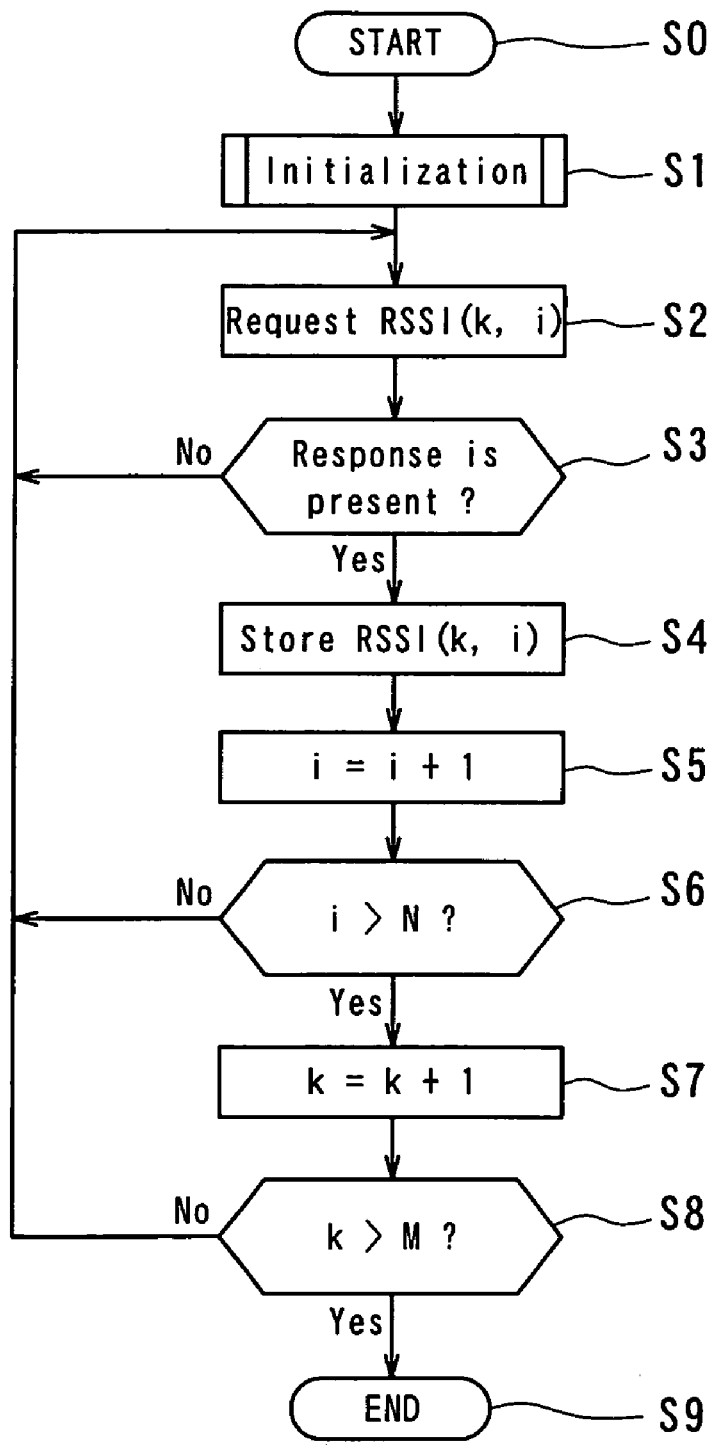
FIG. 7 is a flowchart showing a processing routine of receipt signal strength acquisition control means.

A processing routine of the receipt signal strength acquisition control means, which start processing based on an ignition signal of an engine, will be explained based on a flowchart shown in FIG. 7. There are provided "M" pieces of antennas 6 having sequential antenna numbers k ranging from "1" to "M" assigned thereto, respectively, and there are provided "N" pieces of sensor modules 3 having sensor numbers i ranging from "1" to "N" assigned thereto, respectively. Further, a receipt strength of a signal, at the time when the signal transmitted at a predetermined strength from an antenna having its number "k" is received by a sensor module having its number "i", is designated by RSSI(k, i). Note that each sensor module 3 is provided with receipt signal strength measuring means for measuring a receipt strength.

In this processing routine, there is firstly conducted a initializing step S1 to set an antenna number "k" at 1 and a sensor number "i" at 1, and to set receipt strengths RSSI(k, i) to zero for all "k" and "i". Next, at step S2, there is outputted a command to the reception body portion 7 to acquire a receipt strength RSSI(1, 1) of the 1st sensor module for the 1st antenna.

The reception body portion 7 modulates this command and brings the antenna switching means 8 into a state where the same selects the antenna 6 having the antenna number "1", and then the reception body portion 7 receives, from the sensor module 3 having its sensor number "1", receipt strength data and its ID, to demodulate them and output them to the central control module 5, so that the central control module 5 having received the same executes a step S4 for storing the acquired receipt strength RSSI(1, 1). However, there is conducted a step S3 for judging presence/absence of an input from the reception body portion 7 within a predetermined period of time in advance of step S4, and absent such an input, there is retried step S2 for acquiring the receipt strength RSSI(1, 1). Further, in case of absence of such an input even by repeating retries by a predetermined number of times, it is also possible to output a signal representing trouble to a vehicle supervising system to cause it to conduct trouble indication or the like.

The procedure for the antenna number "1" and the sensor number "1" is completed by step S4 for storing the acquired receipt strength RSSI(1, 1), and then, there is acquired a receipt strength RSSI(1, 2) by incrementing a sensor number "i" by 1 while keeping the antenna number "k" at "1" to conduct the same procedure as the above, according to steps S5 and S6. After acquisition of data of receipt strengths RSSI (1, i) from all the sensor modules 3 for the antenna number "1", there are acquired receipt strengths RSSI(2, i) by conducting the same procedure as the above according to steps S7 and S8, and in this way, the receipt signal strength acquisition control means conducts procedures for acquiring the receipt strengths RSSI(k, i) for combinations of all the antenna numbers and sensor numbers, and then terminates the procedures.

Next, the sensor module position specifying means commences a procedure for assigning the ID's of the sensor modules to installed positions of the tires, respectively, and this procedure comprises: comparing the receipt strengths RSSI(k, i) with one another for each antenna number "k"; and, based on the comparison result, assigning the ID of the sensor module which gives the maximum receipt strength RSSI, to a tire installed position previously assigned to the antenna number "k". At this time, each antenna 6 can be configured to have directivity, and be arranged to exhibit the highest sensitivity in the direction of the associated tire, thereby allowing the above assignment to be more reliable.

INDUSTRIAL APPLICABILITY

The present invention can be used as a tire-information administration system for administrating tires of a vehicle such as a construction vehicle or the like in operation.

The invention claimed is:

1. A tire-information administration system comprising: a plurality of sensor modules installed in tires; at least one reception module configured to receive data from the sensor modules; and a central control module configured to command the reception module to acquire data from the sensor modules; wherein
said central control module comprises:
a predetermined number of connection ports for the reception module, assigned in advance to each sensor module; and
control means configured to: sequentially output at a predetermined sampling time a command of data acquisition from a first sensor module, to a first connection port assigned to the first sensor module; assign the first connection port to the first sensor module for a next sampling, when there is a data input from the first sensor module in response to the command; and assign the command of data acquisition from the first sensor module to a second connection port different from the first connection port, and assign the second connection port to the first sensor module for the next sampling, when there is no data input from the first sensor module even by the command issuance.

2. The tire-information administration system according to claim 1, wherein there is outputted a trouble signal of the tire-information administration system, when a response from the first sensor module is absent at all the connection ports.

3. The tire-information administration system according to claim 2, wherein the first sensor module includes means for detecting an internal pressure of the first sensor module's respective tire.

4. The tire-information administration system according to claim 2, wherein the first sensor module includes means for detecting a temperature in the first sensor module's respective tire.

5. The tire-information administration system according to claim 1, wherein the first sensor module includes means for detecting an internal pressure of the first sensor module's respective tire.

6. The tire-information administration system according to claim 1, wherein the first sensor module includes means for detecting a temperature in the first sensor module's respective tire.

7. A tire-information administration system comprising: a plurality of sensor modules mounted in tires, respectively; a reception module configured to receive data from the sensor modules; and a central control module configured to command the reception module to acquire data from the sensor modules;
wherein the reception module comprises: a plurality of antennas each arranged near any one of tires and configured to transmit and receive signals to and from each of the sensor modules; a single reception body portion connected to the antennas via wirings; and antenna switching means for electrically connecting and disconnecting between the reception body portion and each antenna;
wherein the reception body portion is provided with control means for modulating a command signal from the central control module to thereby generate an output signal to a first antenna, and for demodulating a signal from the first antenna to thereby output data to the central control module;
wherein a first sensor module is previously assigned to the first antenna, respectively; and
wherein said central control module is configured to conduct procedures for:
sequentially outputting at a predetermined sampling time a command of data acquisition from the first sensor module, to the first antenna assigned to the first sensor module;
assigning the first antenna to the first sensor module for a next sampling, when there is a data input from the first sensor module in response to the command; and
assigning data acquisition from the first sensor module to a second antenna, and assigning the second antenna to the first sensor module for the next sampling, when there is no data input from the first sensor module even by the command issuance.

8. The tire-information administration system according to claim 7, further comprising an amplifier configured to amplify said transmission signal and said receipt signal, near each antenna.

9. The tire-information administration system according to claim 7, wherein there is outputted a trouble signal of the tire-information administration system, when a response from the first sensor module is absent at all the antennas.

* * * * *